Dec. 24, 1940.   V. H. REMINGTON ET AL   2,225,659
CERAMIC COLOR AND PROCESS OF PREPARING THE SAME
Filed Sept. 30, 1936
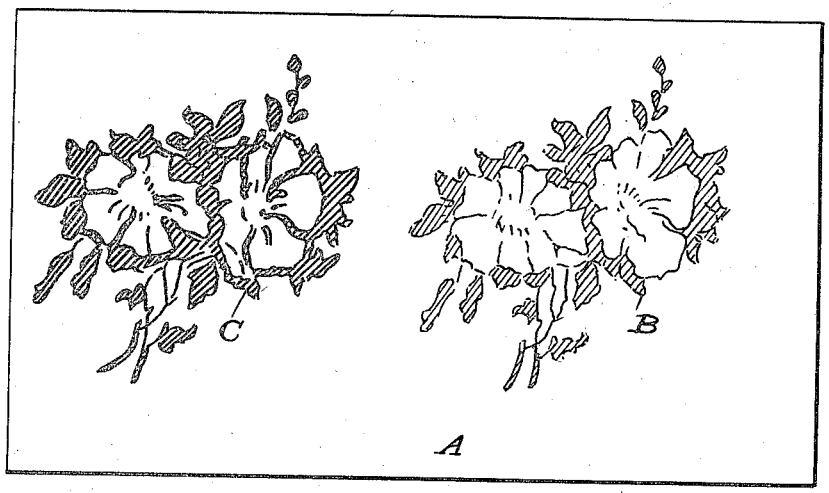
Inventors
Victor H. Remington
and Ray Andrews.

Patented Dec. 24, 1940

2,225,659

UNITED STATES PATENT OFFICE 2,225,659

CERAMIC COLOR AND PROCESS OF PREPARING THE SAME

Victor Hawthorne Remington and Ray Andrews, Washington, Pa., assignors to B. F. Drakenfeld & Co. Inc., New York, N. Y., a corporation of New York Application September 30, 1936, Serial No. 103,452

11 Claims. (Cl. 106—36.2)

Our present invention relates to an improvement in the method of decoration of surfaces of glass, porcelain, vitreous enamel, china and pottery, and the like, and to an improvement in the coloring materials used in such decoration.

One of the principal objects of our invention is to provide a coloring material and method of applying it, in which results comparable to the silk screen process of printing and steel plate transfer work may be secured, without, however, requiring the use or preparation of screens or plates.

Another object of our invention is to provide a coloring material which, when applied to a printing oil impression, placed on the surface to be decorated by a rubber stamp or the like, will be thoroughly "wetted" by the oil of the impression, and will penetrate the oil, with the result that a greater amount and a much heavier deposit of the color adheres to the impression, and a smoother and more uniform distribution of color on the impression is secured than heretofore, so that when the surface is fired, much greater strength, brilliance, opacity and uniformity of color is obtained than heretofore.

A further object of the invention is to provide a coloring material having a great affinity for printing oil, and at the same time, an exceedingly poor one for the surface to be decorated, whereby, when the coloring material is applied to the surface having a printing oil impression thereon, it will readily and quickly adhere to the impression, but will not adhere to the surface, or only in a slight degree, and easily removable, with the result that the coloring material is taken up by the oil impression in relatively great quantities throughout the area of the impression, and when the surface is fired, the decorated area has relatively great smoothness and opacity of color, and exceedingly sharp and distinct definition.

A further object of our invention is to improve the present rubber stamp method of decorating articles, and to produce on ceramic articles a decoration of much greater strength and body than heretofore obtainable by this method. The usual rubber stamp method of applying vitrifiable color to ceramic articles, comprises applying a sticky oil or similar substance, as a liquid or paste, to the surface of the object to be decorated by means of a die of rubber or gelatin composition. Into the sticky design, a suitable ceramic color is powdered and rubbed by a tuft of cotton, or the like. The article so stamped and colored, is then subjected to the necessary temperature to permanently fuse the ceramic color to the ware. This method heretofore used, has the disadvantage that the decorations produced exhibit thin, weak and pale appearance. By the use, however, of colors made according to our present invention, a greater amount of the ceramic pigment adheres to the oil design, and accordingly, the printed decoration is much more opaque, intense, smooth, and pleasing in appearance.

With these and other objects in view, which will become more apparent as the description proceeds, reference is had to the following description, and to the accompanying drawing in which the figure illustrates a plan view of a glass surface such as a plate, having thereon decorations obtained by the same manner of application, one of such decorations illustrating the results obtained by the use of coloring matter known in the art, the other of such decorations illustrating in contrast the results obtained by the use of color prepared by our invention.

In proceeding in accordance with our invention, dry ceramic vitrifiable color is mixed with acetone in amount sufficient to form a thin paste. To this pasty mixture a little pine oil is added and the whole agitated so that a thorough incorporation of the oil in the color is accomplished. Then the acetone is driven off either by heating the mixture over boiling water, or by allowing the acetone to normally volatilize in the atmosphere. The removal of the acetone does not leave the color caked, and no further pulverization is needed, consequently the color is ready to be used.

In applying the color, a thin layer of printing oil is first rolled onto a glass tile or other suitable surface. A rubber stamp having thereon the design to be impressed on the ware to be decorated is inked from the tile and then applied to the ware, thus leaving thereon a tacky impression of surface configuration corresponding to the design to be colored. Into this sticky design on the ware the color is now dusted or powdered and lightly rubbed with a tuft of cotton or the like. The color, unlike those heretofore in use, does not tend to stick to the portions of the surface not covered by the tacky design, and where it may become deposited on such portions is easily removed by wiping with a cotton tuft, or by jarring the surface to dislodge the excess color. When the color has been applied to the printed impression, the article is fired in the usual way, to permanently fuse the color to the ware.

We have found that in coloring material prepared according to our invention, each particle of the ceramic color, through the action of the acetone in permeating the batch as it is mixed therewith and evaporated off, becomes coated with a minute, but sufficient film of the pine oil. The acetone acts as a carrier and a solvent for the pine oil, so that the latter becomes dispersed throughout the entire mass of color particles during the agitation process, eventually enveloping each of the particles of color with a thin film which is left adhering upon the removal of the acetone.

When the color is deposited on the tacky impression, the particles of color are readily "wet" by the oil forming the impression, owing to the reduced surface tension between the film of oil on the particles and the oil of the impression, the pine oil being soluble in the printing oil. The particles of color thus penetrate deeply into the impression. This results in a greater quantity of the color particles adhering to the impression than with colors heretofore used, and it is found when the article is fired, that much greater strength, brilliance, and opacity of color is obtained than with colors heretofore used in the art. Indeed, the results obtained are comparable to those obtained by the silk screen printing process and the steel plate transfer process known in the art. At the same time, our process does not require the use or preparation of silk screens or steel plates. Where the shape of the article or the small quantity to be decorated would make it impracticable to prepare silk screen stencils or etch a steel plate, our process is also of particular value, by reason of the comparable results obtained as heretofore pointed out, and by reason of the comparatively small cost attendant to the preparation and application of the colors according to our process. Our colors are particularly valuable where they are of the acid and alkali resisting nature, for when prepared by our method, such colors easily deposit advantageously upon the printed design, whereas, it has been especially hard heretofore, to get acid and alkali resisting colors to adhere to printed designs. Furthermore, the heavy deposit of color obtained by our process is much more permanent against removal by ordinary wearing conditions than the light thin film heretofore obtained.

The ceramic colors used by us as the basis of our color preparation, are glass enamels, being essentially lead boro silicate glasses of a low fusing type. They consist of a flux and a coloring pigment. A typical flux may be made from red lead, sand and borax or boric acid. A typical flux batch would be

|  | Pounds |
|---|---|
| Red lead | 100 |
| Sand | 15 |
| Boric acid | 20 |

This batch is melted in a furnace, and while still molten is allowed to run into water. As the molten bath contacts with the water, it breaks in small pieces, which are collected and placed in a ball mill for grinding, with the selected inorganic pigment. Such mills ordinarily take the shape of porcelain lined revolving cylinders. The mill is charged in addition to the flux, with the pigment for giving the desired color and with water, and flint pebbles are deposited in the mill, which, in the course of continuous revolution, crush and grind the flux to particles of 325 mesh or finer. When grinding is completed, the slurry is drawn off and placed in pans to dry. When dried, the material is in the form of a cake, which is then mechanically fluffed or pulverized, to produce a fine, dry powder. A typical batch for a rust-red colored enamel would be

|  | Pounds |
|---|---|
| Flux | 100 |
| Red iron oxide | 20 |

The dry ceramic vitrifiable color thus produced is used as the basis of the coloring material prepared according to our process, as above set forth. The proportion of pine oil added, should be about five percent by weight of the color. However, since there is no chemical reaction among the compounds of the mixture, the proportions may vary within wide limits.

While pine oil is preferred, other oils may be substituted such as

Cotton seed oil
Olive oil
Light mineral oil
Castor oil and non-gumming essential oils. Oils that gum, should not be used for the color powder prepared with them would soon become a sticky conglomerate mass, and would not remain in a light, fluffy and powdery condition, as with the powder prepared according to our process.

Substitutions may also be made for the acetone. Whatever vehicle is used, however, must have a low evaporation point and must act as a solvent for the oil that is mixed with the color. Among such vehicles are the following—

Petroleum ether
Keytone ethers (such as methyl ether, and ethyl ether)
Alcohols (such as ethyl alcohol), and low boiling hydrocarbons, such as pentane and hexane.

For the printing oil used in making the impressions on the ware on which the color is to be dusted, may be substituted other materials which will not affect the color during the baking or firing period, and which will, at the same time, be sufficiently sticky or tacky, such as Damar varnish
Decalcomania varnish
Litho varnish
Venice turpentine, and
Heavy refined tar.

The results obtained by our invention in comparison to the results obtained by the use of coloring material heretofore known, are illustrated in the drawing in which, A, indicates a glass plate, having a colored design fired on it at B, the colors being prepared and applied as heretofore known in the art, while at C, is indicated a color design fired on, in which the colors and process are those of our invention herein above set forth. The relatively great strength, brilliance and opacity of color obtained by our invention over colors heretofore known in the art, is indicated by the heavier shading in the design C, and the contrast illustrated in the drawing is only indicative of that actually obtained in practice.

In some instances it may be desirable in making up the colors, for instance, for sheet iron and pottery work, to have the color of a somewhat higher fusing temperature than that of the example given above, and to do this it is only necessary to vary the proportions of the ingredients. Thus a high fusing color may be made by decreasing the lead content and adding more silica. A typical batch would thus be

| | Pounds |
|---|---|
| Red lead | 45 |
| Sand | 50 |
| Boric acid | 16 |

The foregoing detailed desecription has been given for purposes of full explanation and comprehension of our invention, and should not be understood as limiting the same, and the appended claims should be construed as broadly as permissible, in view of the prior art.

Having thus described our invention what we claim as new, and desire to secure by U. S. Letters Patent is:

1. A vitrifiable ceramic coloring material adapted to be applied to glassware and the like preparatory to firing thereupon comprising the composition of substantially dry finely ground powdered glass enamel, the particles of which are intimately coated with pine oil with the aid of a volatile solvent for the pine oil.

2. A vitrifiable ceramic coloring material adapted to be applied to glassware and the like preparatory to firing thereupon, comprising a substantially dry finely ground glass enamel, the particles of which are enveloped by a thin film of pine oil.

3. The process of preparing a vitrifiable ceramic coloring material comprising mixing powdered glass enamel with acetone, adding pine oil, mixing the whole together, and thereafter driving off the acetone.

4. The method of preparing a vitrifiable ceramic coloring material adapted to be applied to glassware and the like, comprising thoroughly mixing finely ground glass enamel, acetone and pine oil, and enveloping the particles of enamel with films of pine oil, and driving off the acetone.

5. The process of preparing a vitrifiable ceramic coloring material adapted to be applied to glassware and the like, comprising mixing finely ground glass enamel with pine oil and a solvent for the pine oil, and driving off the solvent.

6. The method of preparing a powdered vitrifiable ceramic coloring material adapted to be applied to glassware and the like, comprising intimately mixing finely powdered glass enamel with an oil selected from the group consisting of pine oil, cotton seed oil, olive oil, light mineral oil, and castor oil, with a solvent for the oil, and driving off the solvent.

7. A vitrifiable ceramic coloring composition adapted to be applied to glassware and the like preparatory to firing thereupon comprising a substantially dry vitreous colored powdered enamel having the individual particles enveloped by a thin oil film.

8. A vitrifiable ceramic coloring composition adapted to be applied to glassware and the like preparatory to firing thereupon comprising a substantially dry vitreous colored powdered enamel having the individual particles enveloped by a thin oil film diffused thereover with the aid of a volatile solvent therefor.

9. A vitrifiable ceramic coloring composition adapted to be applied to glassware and the like preparatory to firing thereupon comprising a substantially dry vitreous colored powdered enamel having the individual particles enveloped by a thin vegetable, mineral or non-gumming essential oil film.

10. A vitrifiable ceramic coloring composition adapted to be applied to glassware and the like preparatory to firing thereupon comprising a substantially dry vitreous colored powdered enamel having the individual particles enveloped by a vegetable, mineral or non-gumming essential oil film diffused thereover with the aid of a volatile solvent therefor.

11. The process of preparing a vitrifiable ceramic coloring material adapted to be applied to glassware and the like comprising intimately mixing finely ground glass enamel with oil and a solvent for the oil, and driving off the solvent.

VICTOR HAWTHORNE REMINGTON.
RAY ANDREWS.